United States Patent
Tsuchiya et al.

(10) Patent No.: US 8,964,046 B2
(45) Date of Patent: Feb. 24, 2015

(54) AMOUNT-OF-SHAKE SENSING APPARATUS, IMAGING APPARATUS, AND METHOD OF DETECTING THE AMOUNT OF SHAKE

(71) Applicant: Olympus Corporation, Tokyo (JP)

(72) Inventors: Hitoshi Tsuchiya, Tokyo (JP); Hisashi Takeuchi, Tokyo (JP); Kiyoshi Tanaka, Tokyo (JP); Yoshinobu Omata, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/093,896

(22) Filed: Dec. 2, 2013

(65) Prior Publication Data

US 2014/0085494 A1    Mar. 27, 2014

Related U.S. Application Data

(63) Continuation of application No. PCT/JP2013/052905, filed on Feb. 7, 2013.

(30) Foreign Application Priority Data

Jul. 24, 2012   (JP) .................................. 2012-163283

(51) Int. Cl.
  *H04N 5/228*    (2006.01)
  *H04N 5/232*    (2006.01)
  *G01C 19/56*    (2012.01)

(52) U.S. Cl.
  CPC ....... *H04N 5/23267* (2013.01); *H04N 5/23258* (2013.01); *H04N 5/23264* (2013.01); *G01C 19/56* (2013.01); *G03B 2217/005* (2013.01)
  USPC ................... 348/208.4; 348/208.2; 348/208.7

(58) Field of Classification Search
  None
  See application file for complete search history.

(56) References Cited

U.S. PATENT DOCUMENTS

| | | | | |
|---|---|---|---|---|
| 2005/0276590 | A1* | 12/2005 | Ishikawa et al. ................. | 396/55 |
| 2007/0147813 | A1* | 6/2007 | Washisu .......................... | 396/53 |
| 2010/0215353 | A1* | 8/2010 | Hashi et al. ..................... | 396/55 |
| 2010/0245603 | A1* | 9/2010 | Hashi et al. ................. | 348/208.5 |
| 2012/0093493 | A1* | 4/2012 | Wakamatsu .................... | 396/55 |
| 2012/0268555 | A1* | 10/2012 | Yamashita et al. .............. | 348/37 |

FOREIGN PATENT DOCUMENTS

| | | |
|---|---|---|
| JP | 07-225405 A | 8/1995 |
| WO | WO 2009/060624 A1 | 5/2009 |

* cited by examiner

*Primary Examiner* — Aung S Moe
*Assistant Examiner* — Euel Cowan
(74) *Attorney, Agent, or Firm* — Scully, Scott, Murphy & Presser, PC

(57) ABSTRACT

The apparatus of the invention is characterized by executing first integration operation for time-integrating the first acceleration to calculate a first velocity, second integration operation for time-integrating the first velocity to calculate an amount of movement in the first axial direction, estimation operation for calculating an estimated first velocity in the first axial direction based on a first velocity change found by time integration of the first acceleration from a first timing at which the third angular velocity becomes zero to a second timing at which the third angular velocity again becomes zero, the second angular velocity at the first timing, and the second angular velocity at the second timing, and update operation for updating the first velocity calculated in the first integration operation to the estimated first velocity estimated in the estimation operation.

7 Claims, 8 Drawing Sheets

AMOUNT-OF-SHAKE SENSING APPARATUS, IMAGING APPARATUS, AND METHOD OF DETECTING THE AMOUNT OF SHAKE

ART FIELD

The present invention relates to a sensing apparatus for detecting the amount of shakes occurring from camera-shake as an example, and an imaging apparatus incorporating such an amount-of-shake sensing apparatus.

BACKGROUND ART

In recent years, imaging apparatus (cameras) having the function of correcting camera-shake have gained popularity so that hand-held cameras can be used to take shake-free good images without recourse to tripods or the like yet without taking special heed.

However, the performance of correcting camera-shake is still less than satisfactory, and especially at the time of long-exposure photography, camera-shake often remains under-corrected: the camera-shake correction performance of the imaging apparatus has still some adverse influence on the quality of the images taken. Especially upon long-exposure photography in the so-called macro area, camera-shake correction performance available up to date often remains unsatisfactory.

Camera-shake may be broken down into two types: the so-called angular shake that occurs with changes in the angle of the optical axis of the imaging apparatus and the so-called parallel shifting parallel shifting shake that occurs with movement of the camera body in the direction vertical to the optical axis. Most camera-shake correction functions available up to date are limited to the correction of angular shake alone, and parallel shifting shake remains uncorrected. Although this parallel shifting shake is little noticeable especially in the case of low image magnifications, yet it has mounting influences on the quality of the images taken as the image magnification grows high. This is the reason why camera-shake correction functions available up to date remain unsatisfactory in the macro area.

Patent Publication 1 discloses an image shake correction camera comprising an acceleration sensor for detecting a triaxial acceleration acting on a camera, an angular velocity sensor for detecting a angular velocity around three axes acting on the camera, an attitude sensor means for calculating from a triaxial acceleration and an angular velocity around three axes a coordinate transform matrix between a camera coordinate system and a stationary coordinate system and a gravity acceleration component calculation means for calculating a gravity acceleration component in the camera coordinate system from the coordinate matrix, wherein the gravity acceleration component is subtracted from an output of the acceleration sensor to figure out a position of parallel shifting motion, and further comprising a correction drive amount calculation means for working out an amount of image shake based on them.

PRIOR PUBLICATIONS

Patent Publication

Patent Publication 1: JP(A) 7-225405

SUMMARY OF THE INVENTION

The image shake correction camera of Patent Publication 1 is designed such that influences of gravity acceleration are removed from the results of detection of acceleration in the vertical and lateral directions with respect to the imaging plane of the camera to obtain an acceleration that is then integrated to work out a velocity that is then integrated to calculate an amount of parallel shifting movement.

However, an acceleration sensor is often apt to produce errors with respect to a reference voltage although depending on surrounding temperatures and its own properties. Such errors grow large upon repetition of integration over an extended period of time, causing the actually found velocity and the amount of movement to shift largely and, hence, making accurate detection impossible.

An object of the present invention is to provide an amount-of-shake sensing apparatus, an imaging apparatus and a method for detecting an amount of shake, which can prevent the result of integration from producing errors even when there is an error of an output of an acceleration sensor from a reference voltage so that the amount of parallel shifting movement can accurately be detected.

Means for Solving the Problem

To this end, the present invention provides an amount-of-shake sensing apparatus, comprising:
a first acceleration sensor which detects a first acceleration in a direction of a first axis,
a second angular velocity sensor which detects a second angular velocity around a second axis that is orthogonal to the first axis,
a third angular velocity sensor which detects a third angular velocity around a third axis that is orthogonal to the first axis and the second axis, and
a movement calculator which calculates an amount of movement in the first axial direction based on the first acceleration, the second angular velocity and the third angular velocity, wherein:
the movement calculator executes:
first integration operation for time-integrating the first acceleration to calculate a first velocity,
second integration operation for time-integrating the first velocity to calculate an amount of movement in the direction of first axis,
estimation operation for calculating an estimated first velocity in the first axial direction based on an amount of the first velocity changes found by time integration of the first acceleration from a first timing at which the third angular velocity becomes zero to a second timing at which the third angular velocity again becomes zero, the second angular velocity at the first timing, and the second angular velocity at the second timing, and
update operation for updating the first velocity calculated in the first integration operation to the estimated first velocity estimated in the estimation operation.

The present invention also provides an imaging apparatus, comprising:
the amount-of-shake sensing apparatus as defined above,
an optical system which images light from an object as an object image,
an imaging device which transforms an object image formed by the optical system into image signals, and
a drive unit which drives at least one of the optical system and the imaging device in a direction of canceling out the amount of movement calculated by the amount-of-shake sensing apparatus.

Further, the present invention provides an imaging method, comprising the steps
detecting a first acceleration in a direction of a first axis, detecting a second angular velocity around a second axis that is orthogonal to the first axis, detecting a third angular velocity around a third axis that is orthogonal to the first axis and the second axis, executing calculation operation for calculating an amount of movement in the direction of the first axis based on the first acceleration, the second angular velocity and the third angular velocity, wherein the calculation operation includes:

first integration operation for time-integrating the first acceleration to calculate a first velocity, second integration operation for time-integrating the first velocity to calculate an amount of movement in the first axial direction, estimation operation for calculating an estimated first velocity in the first axial direction based on a first velocity change found by time integration of the first acceleration from a first timing at which the third angular velocity becomes zero to a second timing at which the third angular velocity again becomes zero, the second angular velocity at the first timing, and the second angular velocity at the second timing, and update operation for updating the first velocity calculated in the first integration operation to the estimated first velocity estimated in the estimation operation.

EMBODIMENTS OF THE INVENTION

Some embodiments of the invention are now explained with reference to the accompanying drawings. FIGS. 1 to 8 show specific embodiments of the invention, and FIG. 1 in particular is a perspective view of the type of rotational motions occurring in the imaging apparatus.

First of all, the coordinate system and directions of rotation set on an imaging apparatus 1 (including various apparatus capable of taking images such as digital cameras, video cameras, and cellular phones equipped with camera functions, and typically called the camera 1) are explained.

The camera 1 comprises an optical system 2 for imaging light from an object as an object image, with the Z direction defined by the axial direction of the optical system 2. More specifically, the positive Z direction is defined by a direction of the camera 1 facing the object. In the standard attitude (so-called lateral position) of the camera 1, the X direction is defined by the horizontal direction of the camera 1. More specifically, the positive X direction is defined by a right direction as viewed from the object side toward the camera 1 (i.e., a left direction as viewed from the camera operator toward the camera 1). Further in the standard attitude of the camera 1, the Y direction is defined by a vertical direction to the camera 1. More specifically, the positive Y direction is defined by an upward direction in the standard attitude.

Figure 1:
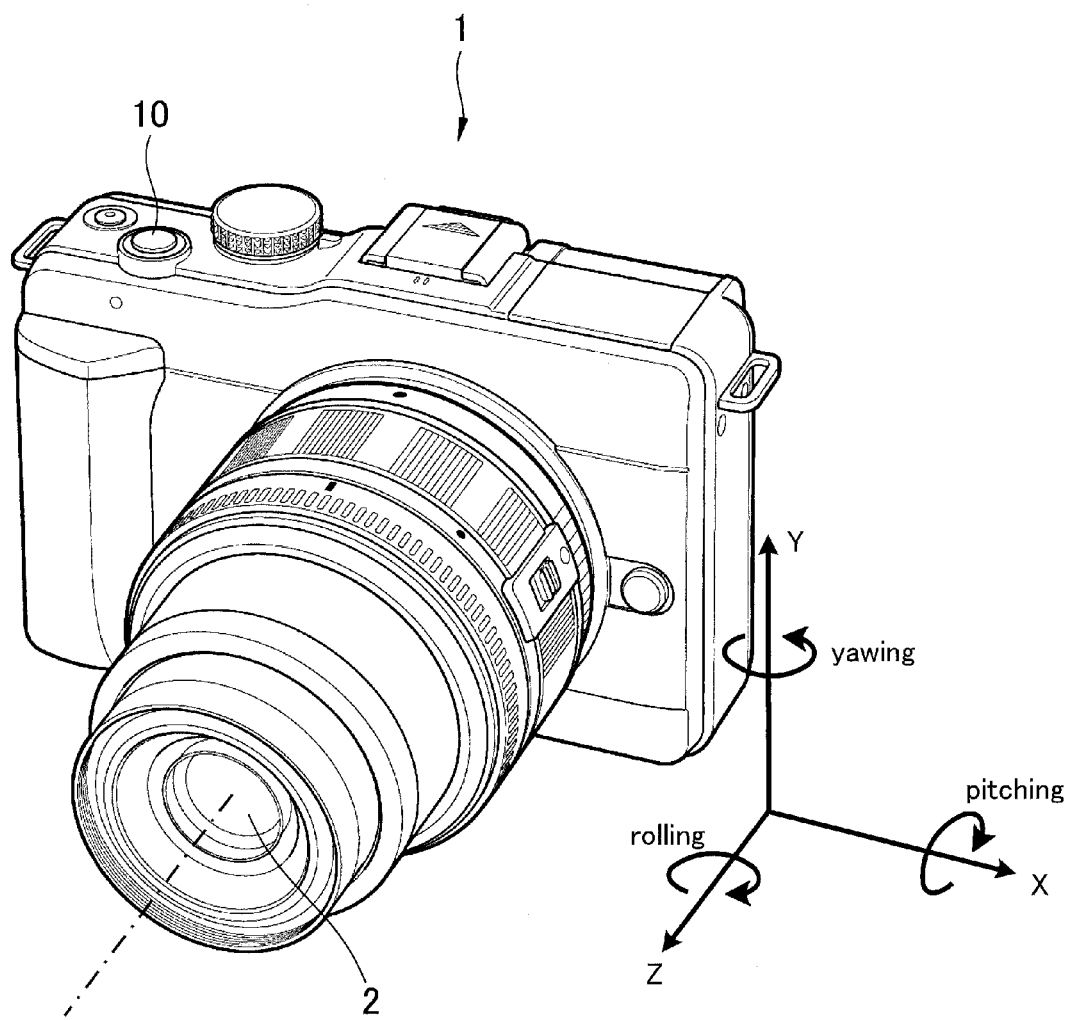
FIG. 1 is illustrative of the type of rotational motion occurring in the imaging apparatus according to an embodiment of the invention.

FIG. 1 is drawn such that the origin position of the coordinate system is shifted to prevent the coordinate system from being difficult to see due to overlapping with the camera 1; however, the origin of the coordinate system lies in the center of the imaging plane of an imaging device 4 (see FIG. 3), which is generally the point of intersection of the imaging plane with the optical axis of the optical system 2. This coordinate system is the one fixed to the camera 1, and if the camera 1 moves or rotates, the coordinate system, too, will move or rotate with respect to the earth. Note here that the X-Y plane of the coordinate system is in coincidence with the imaging plane.

In such a coordinate system, rotational motion around the Z axis provides rolling, rotational motion around the X axis provides pitching, and rotational motion around the Y axis provides yawing. Further in what follows, for instance, suppose that left rotation around the Z axis as viewed from the origin in the positive direction of the Z axis defines the positive direction of rolling rotation, left rotation around the X axis as viewed from the origin in the positive direction of the X axis defines the positive direction of pitching rotation, and right rotation around the Y axis as viewed from the origin in the positive direction of the Y axis defines the positive direction of yawing rotation.

It is here to be noted that the positive and negative directions of the above-mentioned coordinate axes and the positive and negative directions of rotation are optionally defined depending on the mounting direction of the angular velocity sensor assembly 8 and acceleration sensor 9 to be described later (see FIG. 3 and so on) and, hence, they are not theoretically limited to the above.

Referring here to the above-mentioned coordinate system, shakes occurring such as when the center of rotation lies in the origin (or the center of rotation inclusive of the origin lies in the camera 1), for the most part, are angular shake, and there is angular shake plus parallel shifting shake when the center of rotation lies outside the camera 1. In other words, such parallel shifting shake as must be corrected may be considered to occur when the center of rotation lies substantially outside the camera 1.

First, angular shake may be described as rotational motion around the origin. It is well known in the art that as the optical axis shakes from side to side with rotational motion in the yawing direction, it causes the range of the object imaged on the imaging device 4 to move from side to side, and as the optical axis shakes up or down with the rotational motion in the pitching direction, it causes the range of the object imaged on the imaging device 4 to move up or down. It is also well known in the art that rotational motion in the rolling direction causes the screen to be positioned laterally or longitudinally, or obliquely in between.

On the other hand, parallel shifting shake may be described as rotational motion with the center of rotation lying outside the camera 1. FIG. 2(A) is illustrative of how the amount of movement in the X direction occurs by yawing rotation in the imaging apparatus, FIG. 2(B) is illustrative of how the amount of movement in the Y direction occurs by pitching rotation in the imaging apparatus, and FIG. 2(C) are illustrative of how the amounts of movement in the X and Y directions occur by rolling rotation in the imaging apparatus.

As the camera 1 experiences rotational motion in the yawing direction having its center of rotation Cyaw in a position outside the camera 1 and away from the origin by a distance Ryaw (the radius of rotation), there is the amount of movement occurring in the X direction, as shown in FIG. 2(A). As the camera 1 experiences rotational motion in the pitching direction having its center of rotation Cpitch in a position outside the camera 1 and away from the origin by a distance Rpitch (the radius of rotation), there is the amount of movement occurring in the Y direction, as shown in FIG. 2(B). As the camera 1 experiences rotational motion in the rolling direction having its center of rotation Croll in a position outside the camera 1 and away from the origin by a distance Rroll (the radius of rotation), there is generally the amount of movement occurring, inclusive of an amount-of-movement component in the X direction and an amount-of-movement component in the Y direction, as shown in FIG. 2(C).

Of angular shake and parallel shifting shake, the former angular shake may appropriately be processed by known techniques: a specific embodiment of the invention here will be explained mainly with reference to the latter parallel shifting shake.

Figure 3:
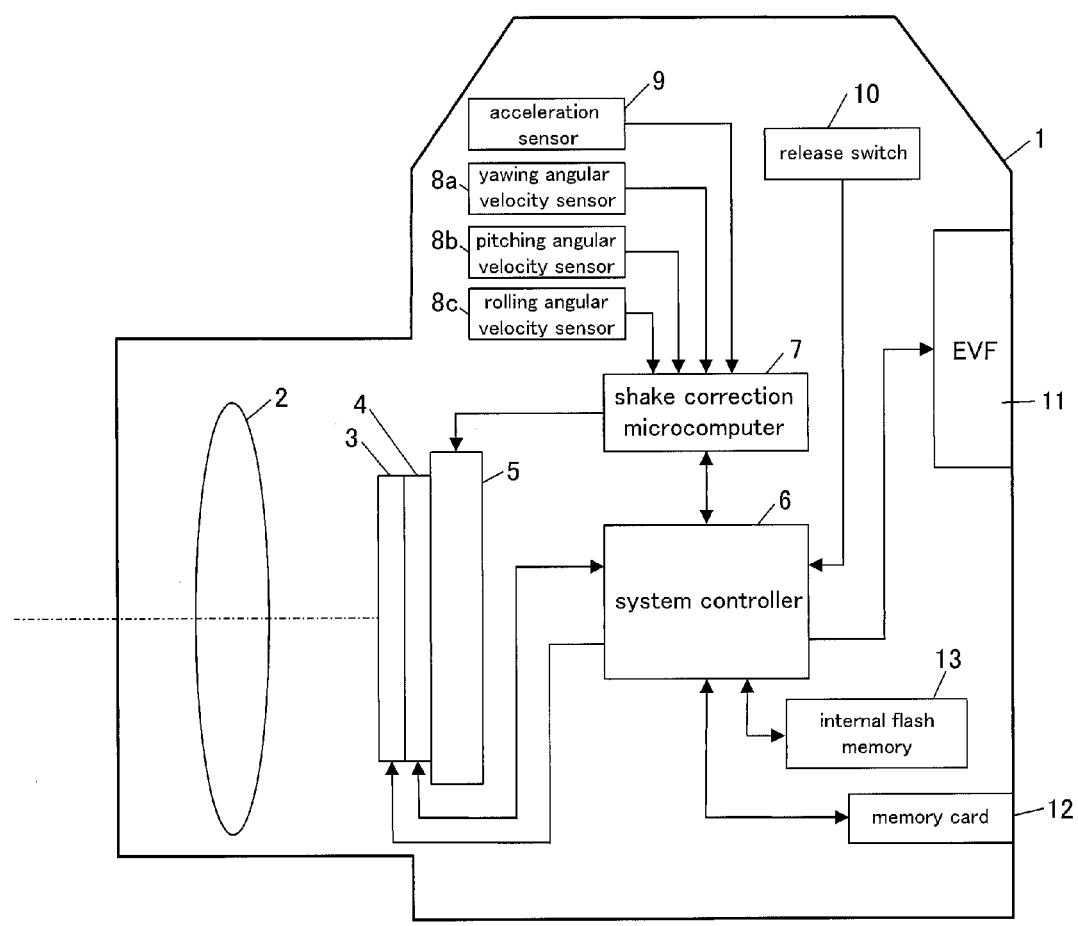
FIG. 3 is a block diagram illustrative of the architecture of the imaging apparatus according to an embodiment of the invention.

Referring first to FIG. 3, the architecture of the imaging apparatus 1 is shown in block diagram form. A camera 1 that is the imaging apparatus comprises an optical system 2, a focal plane shutter 3, an imaging device 4, a drive block 5, a system controller 6, a shake correction microcomputer 7, angular velocity sensors 8a, 8b and 8c, an acceleration sensor 9, a release switch 10, an EVF (electronic view finder) 11 and an internal flash memory 13. Although there is a memory card 12 shown in FIG. 3, it is to be understood that the memory card 12 may typically be attachable to and detachable from the camera 1; it is not always an inherent part in the camera 1.

The optical system 2 is provided to image light from an object as an object image that is formed on the imaging plane of the imaging device 4.

The focal plane shutter 3 is located at the front surface of the imaging device 4 (on the side of the optical system 2) to implement closing/opening operation thereby controlling exposure time. That is, the focal plane shutter 3 is closed for keeping the imaging device 4 exposed to light and opened for blocking the imaging device 4 off light.

The imaging device 4 transforms the object image formed on the imaging plane into electric signals in response to an instruction from the system controller 6. The transformed electric signals are read out by the system controller 6 in the form of image signals.

The drive block 5 supports the imaging device 4 such that it is movable in parallel two-dimensional directions within the imaging plane, and drives the imaging device 4 in the X and Y directions as shown in FIG. 1 or the like in response to an instruction from the shake correction microcomputer 7.

The system controller 6 is provided for integral control of a variety of control operations including reading of the aforementioned image signals and over the whole function of the camera 1. As described just below, the system controller 6 also allows the shake correction microcomputer 7 to implement shake detection and make shake correction on the basis of the result of shake detection.

Being designed as an angular velocity detection block for detecting rotational motion, the angular velocity sensor assembly 8 detects an angle change per unit time as an angular velocity that is then sent out to the shake correction microcomputer 7. Including a yawing angular velocity sensor 8a serving as a yawing angular velocity detection block (the second angular velocity detection block) for detecting a yawing angular velocity about such yawing rotational motion around the Y axis (the second axis) as shown in FIG. 2A, a pitching angular velocity sensor 8b serving as a pitching angular velocity detection block (the first angular velocity detection block) for detecting a pitching angular velocity about such pitching rotational motion around the X axis (the first axis) as shown in FIG. 2B, and a rolling angular velocity sensor 8c serving as a rolling angular velocity detection block (the third angular velocity detection block) for detecting such a rolling angular velocity about rolling rotational motion around the Z axis (the third axis) as shown in FIG. 2C, the angular velocity sensor assembly 8 is designed to detect an angular velocity having 3 degrees of freedom in the rotational direction.

These yawing, pitching and rolling angular velocity sensors 8a, 8b and 8c are adapted to detect rotational motion around each axis by using the same type sensor to make mounting directions different.

The acceleration sensor 9 serves as an acceleration detection block capable of detecting at least accelerations in the X and Y axial directions (X acceleration and Y acceleration). In the embodiment of the invention here, the acceleration sensor 9 is also capable of detecting acceleration in the Z axial direction (Z acceleration). Then, the acceleration sensor 9 sends the accelerations detected in the respective directions out to the shake correction microcomputer 7.

In response to an instruction from the system controller 6, the shake correction microcomputer 7 calculates the amount of shake of the camera 1 from the outputs of the angular velocity sensor assembly 8 and acceleration sensor 9. Then, the shake correction microcomputer 7 sends an instruction out to the drive block 5 to drive the imaging device 4 in a direction opposite to the detected shake direction by the detected amount of shake, thereby allowing the drive block 5 to drive the imaging device 4 in such a way as to cancel out shakes on the imaging plane, resulting in prevention of shakes from occurring at the taken image. While the imaging device 4 is driven for shake correction, it is to be understood that instead of or in addition to this, the optical system 2 may be driven for shake correction.

In the embodiment of the invention here, the amount-of-shake detector is constructed from, and including, the shake correction microcomputer 7, angular velocity sensor assembly 8 and acceleration sensor 9, and the shake correction device is constructed from, and including, this amount-of-shake detector and the drive block 5.

The release switch 10 comprises, for instance, a two-stage press-switch connected to the system controller 6, wherein the first-stage pressing (half-pressing or the $1^{st}$ release) enables AF and AE, and the second-stage pressing (full-pressing or the $2^{nd}$ release) sets off exposure.

The EVF 11 is a display block constructed from, and including, a liquid crystal panel and so on, displaying image signals read out of the imaging device 4 and transformed as by the system controller 6 into a displayable format such that the user can view them.

The memory card 12 is a nonvolatile recording medium capable of recording image signals read out of the imaging device 4 and transformed as by the system controller 6 into a recordable format, and may typically be detachably attached to the camera 1 as described above.

The internal flash memory 13 is a nonvolatile recording medium capable of recording the control program for the camera 1 that is run by the system controller 6, and various parameters used for control.

Figure 4:
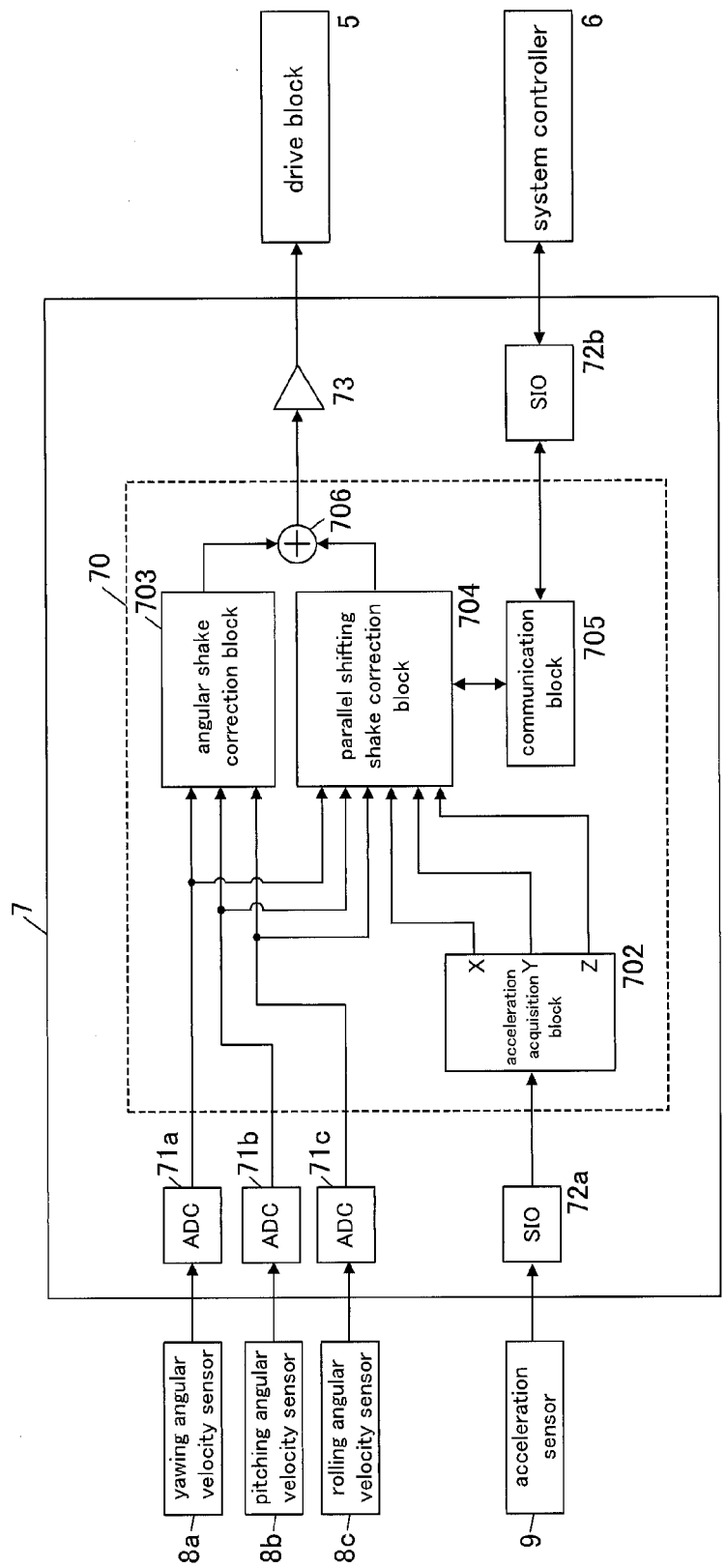
FIG. 4 is a block diagram illustrative of the architecture of the amount-of-shake correction microcomputer according to an embodiment of the invention.

FIG. 4 is a block diagram illustrative of the architecture of the shake-correction microcomputer 7 comprising a CPU 70, ADCs (analog/digital converters) 71a, 71b and 71c, SIOs (serial inputs/outputs) 72a and 72b, and a driver 73.

ADCs 71a, 71b and 71c are provided to convert analog signals entered from the angular velocity sensors 8a, 8b and 8c, respectively, into digital signals.

SIOs 72a and 72b form a communication block that enables CPU 70 to communicate with an external device via interfaces: SIO 72a is used for CPU 70 to read out the value of acceleration detected by the acceleration sensor 9, and SIO 72b is used for CPU 70 to communicate with the system controller 6 for an exchange of commands.

The driver 73 produces out signals for driving the drive block 5 on the basis of the amount of correction calculated by CPU 70.

CPU 70 comprises an acceleration acquirement block 702, an angular shake correction block 703, a parallel shifting shake correction block 704, a communication block 705 and an addition block 706 typically in the form of a function set up by a firmware (that may of course be set up as a hardware), and calculates the amount of correction of angular shake and parallel shifting shake on the basis of the results of detection by the angular velocity sensor assembly 8 and acceleration sensor 9.

Figure 2:
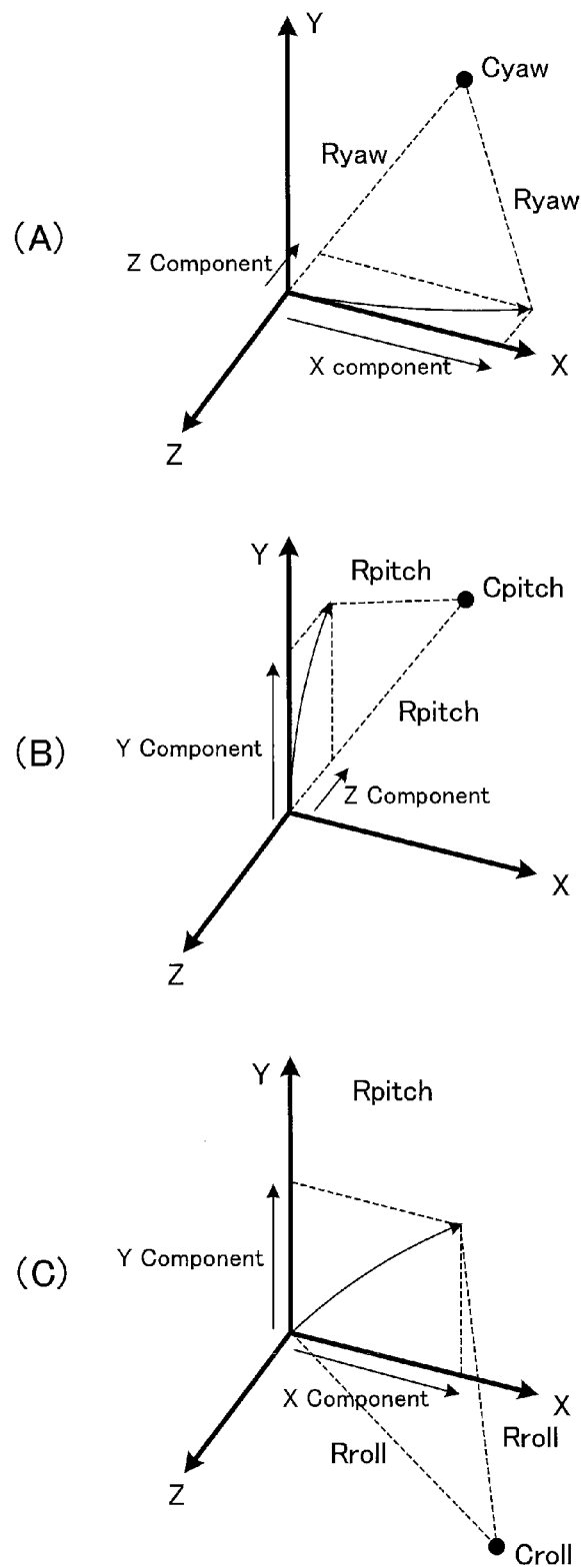
FIG. 2 is illustrative of the amount of motions in the X, Y and Z directions at the time when yawing rotation, pitching rotation and rolling rotation occur in the imaging apparatus according to an embodiment of the invention.

The acceleration acquirement block 702 reads the triaxial accelerations independent from the acceleration sensor via SIO 72a to divide them into acceleration information in the respective X, Y and Z-axis directions as shown in FIG. 2 or the like. Then, the acceleration acquirement block 702 sends the acquired X and Y accelerations out to the parallel shifting shake correction block 704.

The angular shake correction block 703 calculates the amount of shake (angular shake) in association with angle changes on the basis of yawing rotational motion and pitching rotational motion; however, there are no details given of this angular shake because known techniques may optionally be used for it.

The parallel shifting shake correction block 704 calculates the amount of parallel shifting movement of the camera 1 on the basis of acceleration and angular velocity, and transforms the calculated amount of movement into the amount of shake of the object image on the imaging plane, transmitting it to the drive block 5 as the amount of correction.

The communication block 705 communicates with the system controller 6 via SIO 72b.

The addition block 706 adds the amount of angular shake calculated by the angular shake correction block 703 to the amount of parallel shifting shake calculated by the parallel shifting shake correction block 704 to send the total sum of shake out to the driver 73.

It is here to be noted that the outputs of ADC 71a, 71b and 71c and the accelerations produced out of the acceleration acquisition block 702 in the respective X, Y and Z directions may be subjected to high-pass filtering processing or zero point correction processing for removal of low-frequency components. By way of example but not by way of limitation, the low-frequency component to be here removed includes frequency components of up to 1 Hz. Frequencies based on camera-shake are experimentally found to lie between about 1 Hz and about 10 Hz, indicating that it is possible to remove components changing with time due to sensor movements caused by factors other than camera-shake (for instance, drifts).

Further, if the accelerations acquired in the acceleration acquisition block 702 in the respective directions are corrected for gravity, then it is possible to improve the precision of calculation of the amount of shake in the parallel shifting shake correction block 704.

Figure 5:
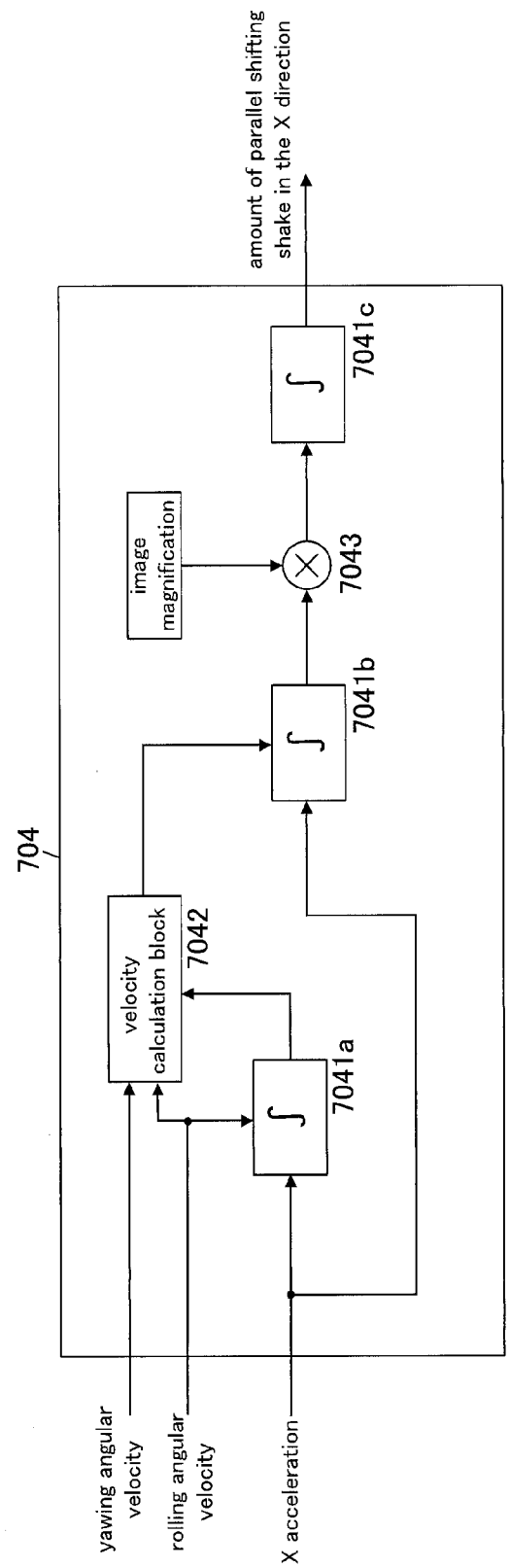
FIG. 5 is a block diagram illustrative of the architecture of the parallel shifting shake correction block according to an embodiment of the invention.

FIG. 5 is a block diagram illustrative of the architecture of the translation shake correction block 704 with respect to the X direction. The translation shake correction block 704 (equivalent to the calculation block of the invention) calculates the amount of movement of the camera body in the X direction based on acceleration and angular velocity, and transforms that amount of movement into the amount of shake of the object image on the image plane for transmission to the drive block 5 as the amount of correction.

The parallel shifting shake correction block 704 is constructed from, and includes, integration blocks 7041a to 7041c, a velocity calculation block 7042 and a multiplication block 7043.

The parallel shifting shake correction block 704 according to the embodiment of the invention here is operable to time-integrate the entered acceleration in the X direction (X acceleration) twice in the integration blocks 7041b and 7041c thereby calculating the amount of parallel shifting shake in the X direction. More specifically, the X acceleration is time-integrated in the integration block 7041b (equivalent to the first integration operation of the invention) thereby calculating the velocity (X velocity) in the X direction, and the X velocity is further time-integrated in the integration block 7041c (equivalent to the second integration operation of the invention) thereby calculating the amount of parallel shifting shake in the X direction. In the multiplication block 7043, the X velocity is also multiplied by the image magnification determined by the state of the optical system 2 for transformation into the velocity of the object image on the imaging plane.

Thus, the parallel shifting shake correction block 704 according to the embodiment of the invention here relies basically upon time integration by two integration blocks 7041b and 7041c for calculation of the amount of parallel shifting shake. However, the acceleration detected by the acceleration sensor 9 has often errors with respect to the reference voltage because of the sensor s own properties. Over long-term integration operation, such errors themselves undergo integration and grow large with the result that the detected amount of parallel shifting shake itself is going to have large errors.

According to the embodiment of the invention here, the integration block 7041a and the velocity calculation block 7042 are used for estimation processing and update processing so as to prevent the errors from growing large. This estimation processing is to use the zero-cross time of the rolling angular velocity (a time period from when the rolling angular velocity becomes zero to when it again becomes zero) to calculate the estimated velocity (estimated X velocity) in the X direction. The estimated X velocity is calculated on the basis of the X velocity added up during the zero-cross time, the yawing angular velocity when the rolling angular velocity first zero-crosses (the timing of the rolling angular velocity becoming zero), and the yawing angular velocity when the rolling angular velocity again zero-crosses (the timing of the rolling angular velocity becoming zero). The estimated X velocity thus calculated is used for update processing of the X velocity calculated in the integration block 7041b, as will be described later.

It is here to be noted that in the former stage of at least one of the integration block 7041a or 7041b, high-pass filtering processing or zero-point correction processing may be implemented for removal of the low-frequency components. As is the case with the processing of the outputs of the above-mentioned ADCs 71a-71c and the accelerations produced out of the acceleration acquisition block 702 in the respective X, Y and Z directions, frequencies of less than 1 Hz will be removed to get rid of the influences of the acceleration sensor 9 on temperatures, etc. and hence on drifts. The processing within the parallel shifting shake correction block 704 may be dispensed with if correction can be made through processing of the outputs of the above-mentioned ADCs 71a-71c and the accelerations produced out of the acceleration acquisition block 702 in the respective X, Y and Z directions.

Figure 6:
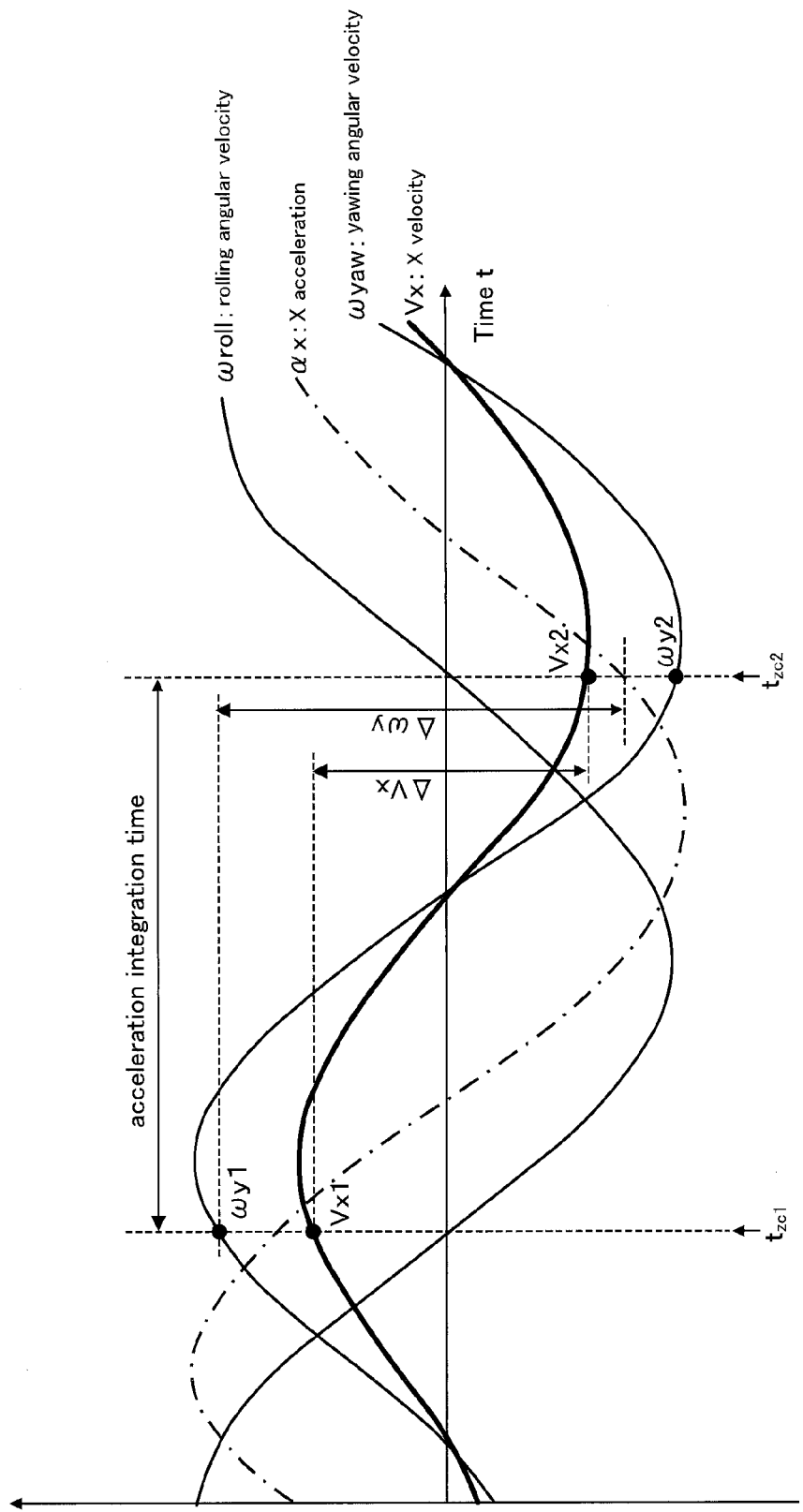
FIG. 6 is illustrative of how to calculate an estimated velocity with respect to the X direction.

FIG. 6 is illustrative of how the estimated velocity (estimated X velocity) with respect to the X direction is worked out. The calculation of the estimated velocity, corresponding to processing by the velocity calculation block 7043 of FIG. 5, is implemented each time the rolling angular velocity zero-crosses.

First, the value of time integration $\Delta V_X$ of the acceleration $\alpha X$ in the X direction during the zero-cross time of when the rolling angular velocity $\omega$roll zero-crosses crosses ($t_{ZC1}$) to when it again zero-crosses ($t_{ZC2}$) and the amount of change $\Delta \omega y$ in the yawing angular velocity $\omega$yaw at the times $t_{ZC1}$ and $t_{ZC1}$ is found. These values may be found from the following equations:

$$\Delta V_x = \int \alpha_x \cdot dt = V_x 2 - V_x 1 \qquad (1)$$

$$\Delta \omega y = \omega Y2 - \omega y1 \qquad (2)$$

Given the radius of rotation R, on the other hand, there may be the following relation holding between the velocity $V_x$ and the angular velocity $\omega$:

$$V = R \cdot \omega \qquad (3)$$

Here, the change in the rolling angular velocity from $t_{ZC1}$ to $t_{ZC2}$ remains zero: the velocity change in the X direction may be considered to result from only the influence of rotational motion in the yawing direction.

$$\Delta V = R \times \Delta \omega yaw \qquad (4)$$

Further on the assumption that the radius of rotation R remains constant during this time period, there may be the following equation holding:

$$V_x 2 = \int (\alpha_x) \cdot dt \times \omega y2 / (\omega y2 - \omega y1) \qquad (5)$$

Therefore, the velocity at $t_{ZC2}$ in the X direction (estimated X velocity) may be calculated from Equation (5).

The calculated velocity in the X direction is defined as the estimated X velocity and updated to the estimated X velocity time-integrated in the time integration block 7041b. In the embodiment of the invention so far described, each time the rolling angular velocity zero-crosses, the X velocity time-integrated in the time-integration block 7041b is updated to the estimated X velocity so that the X acceleration added up in the time-integration block 7041b can be reset to prevent the errors from being added up.

In the embodiment of the invention, although the estimated X velocity is calculated in the velocity calculation block 7042 on the assumption that the radius of rotation R remains constant, it is to be understood that the value of this radius of rotation R or the position of the center of rotational motion is not always constant. In other words, when the radius of rotation R changes largely during the zero-cross time, it is preferable not to update the X velocity because errors grow large upon calculation of the estimated X velocity. Whether or not the radius of rotation R changes largely may be judged from the acceleration $\alpha_x$ vs. angular velocity $\omega$yaw relation.

Figure 7:
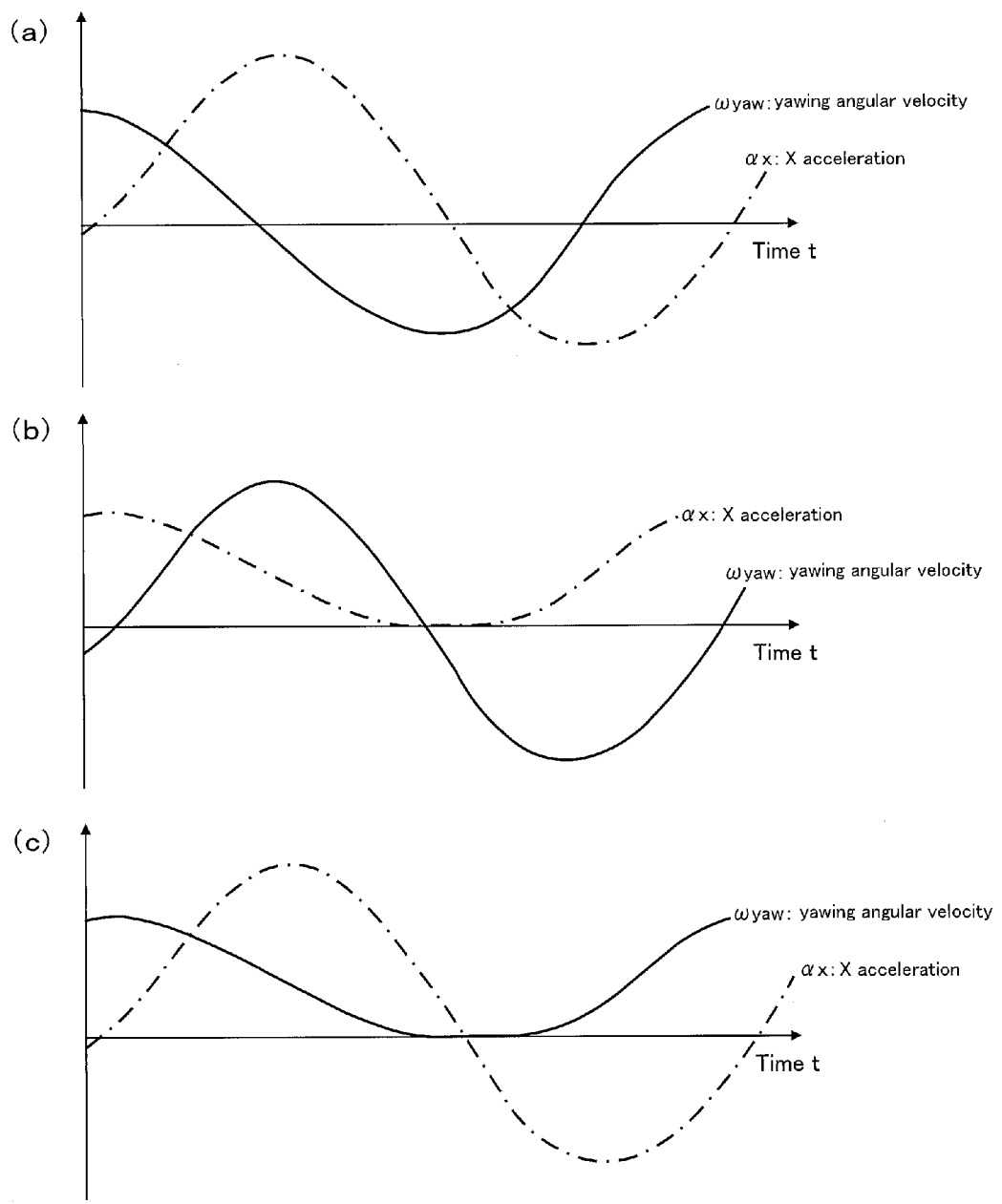
FIG. 7 is illustrative of the reliability of the estimated X velocity on the basis of the X acceleration αx vs. yawing angular velocity ωyaw relations.

FIG. 7 is indicative of the X acceleration $\alpha_x$ vs. angular velocity $\omega$yaw relation. Suppose now that camera-shake were considered to be reciprocal motion caused by repulsive force. The acceleration reaches a maximum at the timing of the angular velocity becoming zero. Then, the angular velocity and acceleration satisfy such a relation as shown in FIG. 7(a). In actual applications, however, such relations as shown in FIGS. 7(b) and 7(c) are observed as phenomena. In such phenomena, the value of the radius of rotation R would be considered to change largely such as when there is a shift of the center of rotation of parallel shifting motion occurring in the camera body, and the influences of rolling prevail. It is then impossible to calculate any right velocity from Equation (5).

In the embodiment of the invention, therefore, processing of judging the reliability of the estimated X velocity is implemented, and only when the estimated X velocity is judged as having reliability, update processing is going to be implemented with respect to the estimated X velocity. The reliability of this estimated X velocity is specifically all about the radius of rotation R judged on the basis of the X acceleration $\alpha_x$ vs. angular velocity $\omega$yaw relation.

More specifically, reliability is judged on the basis of whether or not the absolute value of the X acceleration $\alpha_x$ is sufficiently large, i.e., it is larger than the predetermined threshold value when the yawing angular velocity $\omega$yaw zero-crosses (becomes zero) during the zero-cross time as explained with reference to FIG. 7, i.e., during the time period from when the rolling angular velocity $\omega$roll zero-crosses to when it again zero-crosses. When the absolute value of the X acceleration $\alpha_x$ is larger than the threshold value, it is judged as being reliable, whereas when the absolute value of X acceleration $\alpha_x$ is less than the threshold value, it is judged as being unreliable.

In the embodiment of the invention so far explained, the processing of judging the reliability of the estimated X velocity is executed to determine whether or not update processing is to be implemented, and only during the zero-cross time having such reliability as shown in FIG. 7(a), the X velocity is updated thereby preventing it from being updated to a wrong velocity.

Figure 8:
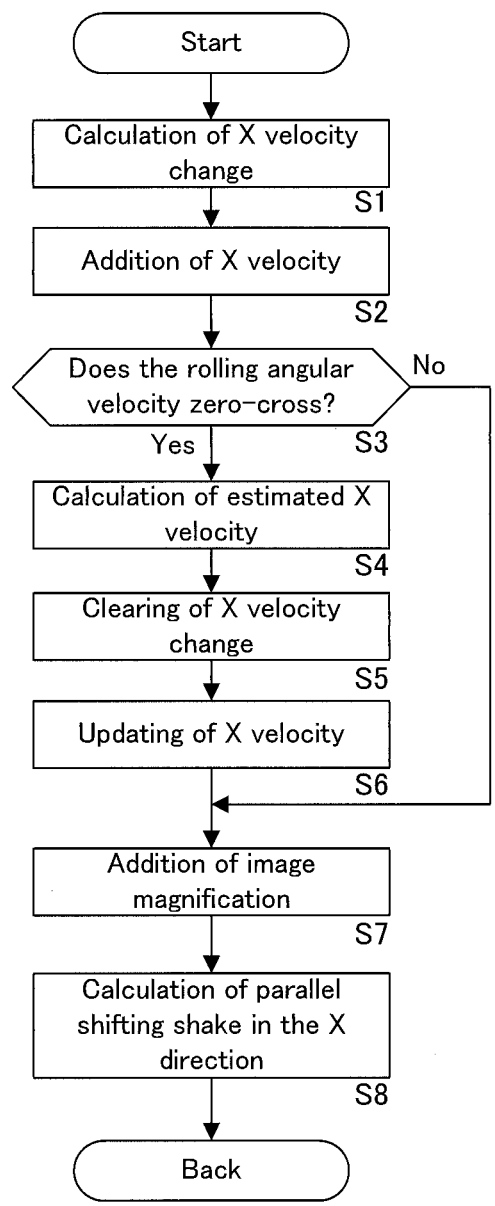
FIG. 8 is a flowchart indicative of how to control the detection of the amount of parallel shifting movement according to an embodiment of the invention.

The control flow for detecting the amount of transitional movement according to the embodiment of the invention is now explained with reference to FIG. 8. Upon commencement of processing, the X acceleration is first time-integrated in the integration block 7041a to calculate the X velocity change (S1). The time-integration in the integration block 7041a is regularly cleared in the former S5 so that the value of time-integration can be free of any errors occurring in the acceleration sensor 9 or the like.

Then, the X acceleration is time-integrated in the integration block 7041b to calculate the X velocity (S2).

Then, whether or not the rolling angular velocity zero-crosses is judged (S3): it may be determined on the basis of whether or not the sign of the former value of rolling angular velocity is in coincidence with that of the value of rolling angular velocity on this occasion. When zero-cross occurs (YES), processing S4 is took over, and when not (S3: No), processing S7 is took over.

When the rolling angular velocity zero-crosses, the velocity calculation block 7042 operates to calculate the estimated X velocity (S4). As explained with reference to Equation (5), this is calculated on the basis of the amount of changes in the yawing angular velocity between the zero-cross times on the former occasion and this occasion, and the value of time-integration of the acceleration from the former zero-cross time.

After calculation of this estimated X velocity, the results of integration in the integration block 7041a is cleared (S5). Thus, the results of integration for calculation of the estimated X velocity are cleared each time the rolling angular velocity zero-crosses so that there is no risk of errors being added up over an extended period of time.

Then, the output of the integration block 7041b is updated to (or replaced by) the estimated X velocity calculated in S4. However, when the estimated X velocity is judged as being lacking in reliability in the above-mentioned reliability judgment processing, no update processing is applied. In the reliability judgment processing, there is judgment made of whether or not the yawing angular velocity zero-crosses during the zero-cross time of the rolling angular velocity, and when the absolute value of the associated X acceleration exceeds the predetermined threshold value, the estimated X velocity is judged as being of reliability. Note here that how to judge reliability is not limited to the above-mentioned one. A variety of methods may be used provided that there are no considerable changes judged as being in the acceleration vs. angular velocity relations during the zero-cross time.

Then in the multiplication block 7043, the X velocity produced out of the integration block 7041b is multiplied by the image magnification (S7) that is obtained from the system controller 6 by communication via the communication block 705 and SIO 72b.

The X velocity corrected in S7 is time-integrated by processing corresponding to the integration block 7041c to calculate it as the amount of parallel shifting shake in the X direction (S8). The calculated amount of parallel shifting shake in the X direction is entered in the drive block 5 for use in correction of the imaging apparatus 1 for image shakes.

While the correction of the imaging apparatus 1 for the amount of shake in the X direction has been explained, it is to be understood that the same holds for correction of the amount of parallel shifting shake in the Y direction: the correction of the amount of shake with respect to a plane parallel with the imaging device 4 can also be made to reduce shakes of object images taken by the imaging device 4. Note here that the amount of correction of parallel shifting shake in the Y direction may be calculated using the Y acceleration, pitching angular velocity and rolling angular velocity provided that as is the case with the correction of the amount of shake in the X direction, the zero-cross time is defined by a time period in which the rolling angular velocity zero-crosses.

While some embodiments according to a certain aspect of the invention have been explained, it is to be understood that the invention is not only limited to them, but also some combinations of them may come under the category of the invention.

EXPLANATION OF THE REFERENCE NUMERALS

1 . . . camera (imaging apparatus)
2 . . . optical system
3 . . . focal plane shutter
4 . . . imaging device
5 . . . drive block
6 . . . system controller
7 . . . shake correction microcomputer
8 . . . angular velocity sensor assembly
8a . . . yawing angular velocity sensor
8b . . . pitching angular velocity sensor
8c . . . rolling angular velocity sensor
9 . . . acceleration sensor
10 . . . release switch
11 . . . EVF (electronic view finder)
12 . . . memory card
13 . . . internal flash memory
71a-71c . . . ADC (analog to digital convertor)
72a, 72b . . . SIO (serial input/output)
73 . . . driver
702 . . . acceleration acquisition block
703 . . . angular shake correction block
704 . . . parallel shifting shake correction block
705 . . . communication block
706 . . . addition block
7041a, 7041b, 7041c . . . integration block
7042 . . . velocity calculation block
7043 . . . multiplication block

What is claimed is:

1. An amount-of-shake sensing apparatus, comprising:
a first acceleration sensor which detects a first acceleration in a direction of a first axis,
a second angular velocity sensor which detects a second angular velocity around a second axis that is orthogonal to the first axis,
a third angular velocity sensor which detects a third angular velocity around a third axis that is orthogonal to the first axis and the second axis, and
a movement calculator which calculates an amount of movement in the direction of first axis based on the first acceleration, the second angular velocity and the third angular velocity, wherein:
the first movement calculator executes:
a first integration operation for time-integrating the first acceleration to calculate a first velocity,
a second integration operation for time-integrating the first velocity to calculate an amount of movement in the direction of the first axis,
an estimation operation for calculating an estimated first velocity in the direction of the first axis based on an amount of the first velocity changes found by time integration of the first acceleration from a first timing at which the third angular velocity becomes zero to a second timing at which the third angular velocity again becomes zero, the second angular velocity at the first timing, and the second angular velocity at the second timing, and
an update operation for updating the first velocity calculated in the first integration operation to the estimated first velocity estimated in the estimation operation.

2. The amount-of-shake sensor apparatus according to claim 1,
wherein the movement calculator executes:
a reliability judgment operation for judging reliability of the estimated first velocity calculated in the estimation operation based on a relation between the first acceleration and the second angular velocity from the first timing to the second timing, wherein:
the update operation is such that only when the estimated first velocity is judged as being of reliability in the reliability judgment operation, the estimated first velocity is updated to the estimated first velocity.

3. The amount-of-shake sensor apparatus according to claim 2,
wherein: the movement calculator executes:
when the first acceleration takes an absolute value exceeding a predetermined value at a time when the second angular velocity is zero, the reliability judgment operation judges the estimated first velocity as having reliability.

4. The amount-of-shake sensing apparatus according to claim 1, further comprising:
a second acceleration sensor which detects a second acceleration in the direction of the second axis, a first angular velocity sensor which detects a first angular velocity around the first axis, and a movement calculator which calculates an amount of movement in the second axis based on the second acceleration, the first angular velocity and the third angular velocity, wherein:

the movement calculator executes:

a third integration operation for time-integrating the second acceleration to calculate a second velocity, a fourth integration operation for time-integrating the second velocity to calculate an amount of movement in the direction of second axis, a second estimation operation for calculating an estimated second velocity in the direction of the second axis based on an amount of the second velocity changes found by time-integration of the second acceleration from a first timing at which the third angular velocity becomes zero to a second timing at which the third angular velocity again becomes zero, the first angular velocity at the first timing and the first angular velocity at the second timing, and an second update operation for updating the second velocity calculated in the third integration operation to the estimated second velocity estimated in the second estimation operation.

5. The amount-of-shake sensor apparatus according to claim 1, wherein: the second movement calculator executes a gravity correction operation for correcting the detected first acceleration for gravity.

6. The imaging apparatus, comprising:

the amount-of-shake sensor apparatus according to claims 1, an optical system which images light from an object as an object image, an imaging device which transforms the object image formed by the optical system into image signals, and a drive unit which drives at least one of the optical system and the imaging device in a direction of canceling out the amount of movement calculated by the amount-of-shake sensor apparatus.

7. An amount-of-shake detection method, comprising steps of:

detecting a first acceleration in a direction of a first axis, detecting a second angular velocity around a second axis that is orthogonal to the first axis, detecting a third angular velocity around a third axis that is orthogonal to the first axis and the second axis, and executing calculation operation for calculating an amount of movement in the first axial direction based on the first acceleration, the second angular velocity and the third angular velocity, wherein the calculation operation includes:

A first integration operation for time-integrating the first acceleration to calculate a first velocity, A second integration operation for time-integrating the velocity to calculate an amount of movement in the first axial direction, An estimation operation for calculating an estimated first velocity in the first axial direction based on an amount of the first velocity changes found by time integration of the first acceleration from a first timing at which the third angular velocity becomes zero to a second timing at which the third angular velocity again becomes zero, the second angular velocity at the first timing, and the second angular velocity at the second timing, and An update operation for updating the first velocity calculated in the first integration operation to the estimated first velocity estimated in the estimation operation.

* * * * *